United States Patent [19]

Trewiler

[11] 4,002,790
[45] Jan. 11, 1977

[54] POSTFORMABLE LAMINATE

[75] Inventor: Carl E. Trewiler, Coshocton, Ohio

[73] Assignee: General Electric Company, Schenectady, N.Y.

[22] Filed: Sept. 6, 1974

[21] Appl. No.: 503,822

Related U.S. Application Data

[63] Continuation of Ser. No. 294,682, Oct. 3, 1972, abandoned.

[52] U.S. Cl. ............................. 428/212; 428/218; 428/530; 428/537; 156/196; 156/222; 156/242; 156/278; 427/391
[51] Int. Cl.² ...................... B32B 7/02; B29D 9/06
[58] Field of Search ..... 161/166, 124, 116, DIG. 3, 161/263, 264; 260/67.6; 156/219, 220, 242, 222, 196, 278; 428/218, 537, 530, 171, 212; 427/391, 395; 264/258, 113

[56] References Cited
UNITED STATES PATENTS

| | | | |
|---|---|---|---|
| 2,350,729 | 6/1944 | Crouet | 428/218 |
| 3,018,206 | 1/1962 | Hood et al. | 161/205 |
| 3,294,622 | 12/1966 | Wark | 161/264 |
| 3,385,749 | 5/1968 | Hampshire | 428/218 |
| 3,402,095 | 9/1968 | Varfeldt et al. | 161/166 |
| 3,470,134 | 9/1969 | Unger | 260/67.6 R |
| 3,480,125 | 11/1969 | Ash | 161/166 |
| 3,539,423 | 11/1970 | Simison et al. | 161/166 |
| 3,627,622 | 12/1971 | Vega | 161/166 |
| 3,645,814 | 2/1972 | Knoepfler et al. | 156/62.8 |
| 3,652,377 | 3/1972 | Helmick | 161/166 |
| 3,660,222 | 5/1972 | Fleming, Jr. et al. | 161/166 |
| 3,817,820 | 6/1974 | Smith | 161/154 |

Primary Examiner—George F. Lesmes
Assistant Examiner—S. Silverman

[57] ABSTRACT

The postformability of laminates particularly decorative laminates, having resin-impregnated paper layers is improved by resin treating at least one of the core layers near the surface of the laminate to render the fibers therein less yielding than those of the other layers.

5 Claims, 1 Drawing Figure

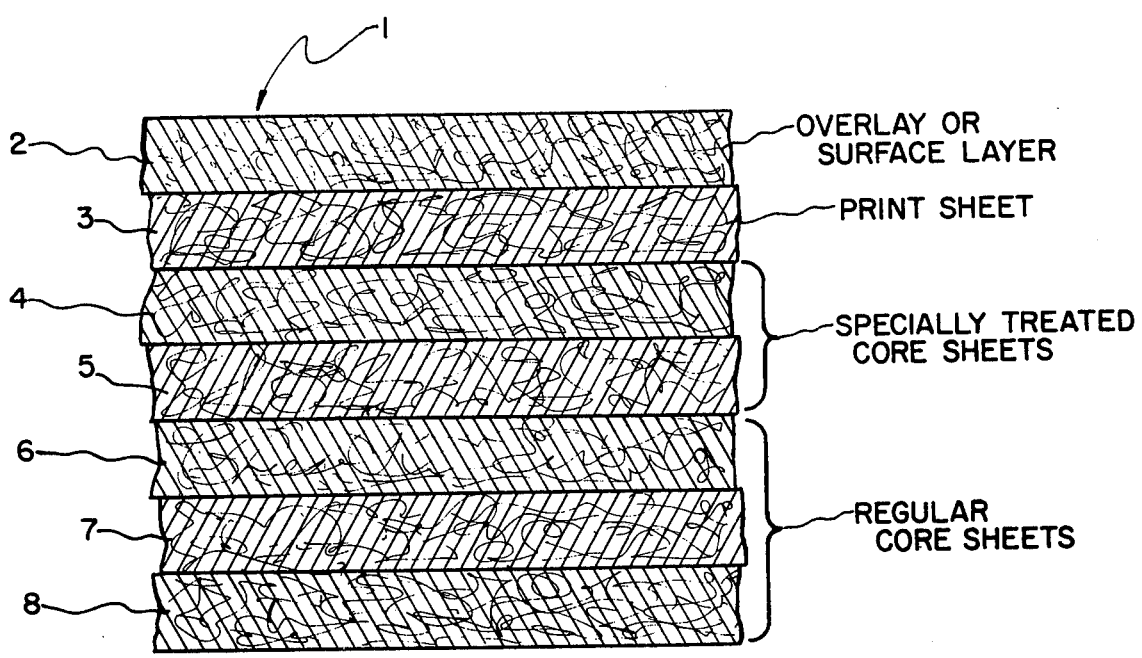

POSTFORMABLE LAMINATE

This is a continuation of application Ser. No. 294,682, filed Oct. 3, 1972, now abandoned.

This invention relates to resin-impregnated laminates. More particularly, it relates to resin-impregnated laminates comprising a plurality of paper layers, said laminates being characterized by improved postformability.

Plastic laminates including those which are overlaid with a decorative print sheet and which may also have a protective surface overlayer are well known, such materials finding a wide variety of uses such as for wall paneling, countertops, desk tops, flooring and the like. It is well known to postform such laminates after suitable heating or to bend or shape them subsequent to the formation of the laminate in order to conform the laminate to, or to form, curved surfaces such as the edges of counters, desks, coves and the like. While most laminates are capable to a certain degree of being postformed, the bent surface often fails or cracks immediately or after a period of time particularly when the radius of curvature is small, and it is a principal object of this invention to provide laminates which are characterized by improved postformability without such surface failure.

Briefly, the invention consists of resin-impregnated paper laminates, the postformability of which is improved by resin treating at least one of the core layers near the surface of the laminate which is to be bent after postforming to render the fibers within said resin-treated core layer less yielding than those of the other layers in the core.

While it is not desired to be bound by any particular theory as to the operation of the invention, it being sufficient that it does indeed perform its purpose, it is believed that the provision of the less yielding core layer shifts the neutral plane or axis of the laminate in bending so that the bent surface layers are not strained in postforming to failure. The concept of a neutral axis is common and accepted and is applied to the bending of structures. For example, in bending any material such as a metal plate or a laminate, all of the structure toward the concave side of the bend and below the neutral axis is placed in compression while all parts of the material above the neutral axis and toward the convex surface are placed in tension. It has been found, for example, that in ordinary decorative laminates having a plurality of core sheets overlaid with a print sheet and an overlay sheet or protective layer and having a thickness of about 0.050 inch, the elongation of the fibers in the convex bent overlay before failure is about 4 percent. The neutral axis of such a typical 0.050 inch thick standard decorative laminate is at approximately the juncture between the first and second core sheets or about 20 mils from the surface.

By rendering the fibers of one or more core sheets near the surface of the laminate which is to be convex when bent less yielding than the other core layers, all layers below it are normally placed in compression during bending or postforming, thus in effect moving the neutral axis nearer said convex surface or near the upper surface of the specially resin-treated core layer or layers. Likewise, with a cove bend or one in which the surface layer is concave, the core layers below the treated layer are placed in tension, the present invention once again providing a desirable shift in the neutral axis. This permits the surface layers to be bent without having to be strained to as great a degree as would be the case with a normal postformed laminate. In other words, the insertion of the specially resin-treated core layer near the surface decreases the strain on the surface in postforming to prevent failure in postforming.

Those features of the invention which are believed to be novel are set forth with particularity in the claims appended hereto. The invention will, however, be better understood and further advantages and objects thereof appreciated from a consideration of the following description and the drawing in which the single FIGURE illustrates a preferred embodiment of the present invention.

The following examples are illustrative of the operation of the invention, it being realized that they are not to be taken as limiting in any way. While the examples are directed primarily to so-called decorative laminates, it will be appreciated that the advantages of the present invention can be obtained by applying them to any type of laminate having resin-impregnated paper, mat, paper-like or similar sheets, plies or layers, the fibers of which tend to become strained when bent. The term "paper" as used herein will be understood to apply to all such materials.

There were prepared laminates as shown in the drawing consisting of an overlay of alpha cellulose paper impregnated with a 50 percent water solution of melamine formaldehyde resin such as Cymel 428 made by American Cyamamid Company, the resin content after drying being typically about 65 percent by weight. There was also prepared in a similar manner a suitable print sheet consisting of a high grade decorative paper such as alpha cellulose, rayon, and the like, such paper being also treated with the above melamine resin to a dried resin content of about 40 percent by weight. Core layers of kraft paper and creped kraft paper were laid up in the desired number, all but the specially treated top core sheets being impregnated with a 50 percent solution of a standard alkaline catalyzed phenol formaldehyde resin, the dried resin content of each core layer being about 30 percent by weight. The two top core sheets were specially treated in accordance with the present invention to render the fibers in the top core layer less yielding relative to the fibers of the other core layers of the laminate. It has been found that the fibers of such core layer can be so rendered relatively unyielding by subjecting the particular paper to a series of resin treatments which not only fill the interstices between the fibers but effectively impregnate the fibers of the paper themselves. This can be accomplished in any of a number of ways. Preferable is a treatment with a relatively low molecular weight phenolic resin which consists nearly exclusively of water soluble phenols and relatively little ash. Such phenolic resins are commercially available as Ashland Catalin Resin 8108 and Reichhold Resin 22-027. The specially treated core sheet is typically treated first with a resin solution of 25 parts of the above resin, 15 parts of methanol and 10 parts of water, the resin content of the dried material being about 26 percent and the volatiles about 2 percent by weight. The first resin treatment was repeated using a resin solution consisting of 75 parts by weight of water, the total resin content after the second treatment being about 35 percent by weight and the volatiles about 3 percent by weight.

In preparing the laminate 1 as shown in the drawing, the core sheets 6, 7 and 8 of kraft crepe were laid up in the usual manner, there being placed on top thereof the specially treated core sheets 4 and 5 of saturating kraft paper to form a layer which is in turn overlaid with print sheet 3 and overlay or surface layer 2. As with normal laminates, the curing can be varied as desired, normally such laid-up laminates being placed between polished stainless steel panels and cured for times ordinarily varying from 20 to 25 minutes at from about 130° C to 150° C at pressures ranging from about 1000 psi to 1500 psi, the laminates then being cooled still under pressure to below 40° C and removed from the press.

When the above laminate of the present invention about 0.050 inch thick was heated to a temperature of 163° C and bent around a 7/16 inch diameter mandrel, there was no failure. On the other hand, a laminate prepared in a similar manner except that the upper core layer was not specially treated in accordance with the present invention failed.

There are provided, then, by the present invention resin-impregnated paper plastic laminates which are particularly characterized by their improved postformability. They are useful in providing surfacing or structural material which must be bent to small radii without failure to provide smooth arcuate surfaces.

What I claim as new and desire to secure by Letters Patent of the United States is:

1. A decorative plastic laminate, characterized by improved postformability render heat, comprising a plurality of paper core sheets, all of said core sheets being resin-impregnated, and an overlying print sheet, at least one of said core sheets next to the print sheet of said laminate, but not all of said core sheets, being specially resin-impregnated to a greater resin content than the other resin-impregnated core sheets to render the fibers in said specially resin-impregnated core sheets less yielding to postforming stresses relative to those of the other resin-impregnated core sheets to reduce failure of the surface of said laminate when said laminate is postformed.

2. A laminate as in claim 1 which has a plurality of core sheets and an overlying resin-impregnated print sheet and protective overlayer.

3. A laminate as in claim 1 wherein more than one of the core sheets next to the print sheet are specially resin-impregnated.

4. A laminate as in claim 1 wherein the specially resin-impregnated two core sheets next to the print sheet are specially resin-impregnated.

5. The process of providing readily heat postformable decorative plastic laminates comprising a plurality of resin-impregnated paper core sheets all of which are resin-impregnated and a superimposed print sheet thereon which comprises resin-impregnating at least one of the core sheets next to the print sheet, but not all of said core sheets, to a greater resin content than the other resin-impregnated core sheets to render said specially resin-impregnated core sheet less yielding than the other core sheets when said laminate is postformed.

* * * * *

UNITED STATES PATENT OFFICE
CERTIFICATE OF CORRECTION

PATENT NO. 4,002,790
DATED : January 11, 1977
INVENTOR(S) : Carl E. Trewiler

It is certified that error appears in the above—identified patent and that said Letters Patent are hereby corrected as shown below:

Column 3, Claim 1, line 2, change "render" to - under -

Signed and Sealed this

Fifth Day of April 1977

[SEAL]

Attest:

RUTH C. MASON
Attesting Officer

C. MARSHALL DANN
Commissioner of Patents and Trademarks